US006324613B1

(12) United States Patent
Aguilar et al.

(10) Patent No.: US 6,324,613 B1
(45) Date of Patent: Nov. 27, 2001

(54) PORT ROUTER

(75) Inventors: Raul A. Aguilar, Hellertown; Kevin Joseph Lynch, Slatington; James Thomas Clee, Orefield; James Edward Guziak, Laurys Station, all of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/477,593

(22) Filed: Jan. 4, 2000

Related U.S. Application Data

(60) Provisional application No. 60/114,771, filed on Jan. 5, 1999, provisional application No. 60/114,772, filed on Jan. 5, 1999, and provisional application No. 60/114,767, filed on Jan. 6, 1999.

(51) Int. Cl.[7] ............................. G06F 13/14; G06F 15/16; G06F 13/00; H04J 3/02; H04J 3/14
(52) U.S. Cl. .......................... 710/129; 710/131; 710/132; 710/36; 710/37; 710/38; 710/41; 370/389; 370/392; 370/360
(58) Field of Search ............................... 710/131, 19, 381, 710/129, 132, 36, 37, 38, 41, 43; 714/7; 370/360, 392, 389; 364/246.8

(56) References Cited

U.S. PATENT DOCUMENTS

| 3,581,286 | * | 5/1971 | Beausoleil ............................. 710/131 |
| 5,107,489 | * | 4/1992 | Brown et al. ......................... 370/360 |
| 5,423,006 | * | 6/1995 | Brown et al. ......................... 710/19 |

(List continued on next page.)

FOREIGN PATENT DOCUMENTS

A11175453   12/1997   (JP) .

OTHER PUBLICATIONS

Kumar V.P. et al: "Augmented Shuffle–Exchange Multistate Interconnection Networks" Computer, US, IEEE Computer Society, Long Beach CA US, vol.20, No. 6, Jun. 1, 1987, pp. 30–40.

(List continued on next page.)

Primary Examiner—Thomas Lee
Assistant Examiner—Katharina Schuster
(74) Attorney, Agent, or Firm—Schnader Harrison Segal & Lewis, LLP

(57) ABSTRACT

An apparatus and method which provide increased data flow through a compute platform by optimizing data flow between an external device and the internal circuitry without the need for user intervention. A port router is provided which includes a controller switch, a port switch, and one or more connections between the controller switch and the port switch. The controller switch, the port switch and the one or more connections are adapted to provide dynamic re-routing of connections between the port switch inputs and the controller switch outputs. A method is also provided for dynamically routing ports to internal circuitry of a compute platform. The method includes providing a configurable switching circuit, querying the configurable switching circuit to determine a default topology, computing an optimized topology upon the occurrence of a change of the data flow through the configurable switching circuit, suspending operation and effecting re-routing between the interface ports and the internal circuitry based on the optimized topology, and resuming IO operations through the configurable switching circuit. The method and apparatus may be applied to personal computer systems, information appliances, set-top boxes, cable modems, game consoles, smart appliances, handheld computers, palm-sized computers, embedded control systems, workstations, servers and the like.

10 Claims, 4 Drawing Sheets

U.S. PATENT DOCUMENTS

| | | | | |
|---|---|---|---|---|
| 5,436,893 | * | 7/1995 | Barnett | 370/392 |
| 5,495,475 | * | 2/1996 | Franaszek et al. | 370/389 |
| 5,530,813 | | 6/1996 | Paulsen et al. | 395/312 |
| 5,553,287 | * | 9/1996 | Bailey et al. | 364/246.8 |
| 5,581,709 | * | 12/1996 | Ito et al. | 710/38 |
| 6,035,366 | * | 3/2000 | Teich | 710/131 |
| 6,128,750 | * | 10/2000 | Espy et al. | 714/7 |

OTHER PUBLICATIONS

Rana D et al: "An Easily Reconfigurable, Circuit Switched Connection Network" Proceedings of the International Symposium on Circuits and Systems, US, New York, IEEE, vol. Conf. 21 Jun. 7, 1988, pp. 237–250.

Sying–Jyan Wang: "Load–Balancing in Multstage Interconnection Networks Under Multiple–Pass Routing" Journal of Parallel and Distributed Computing, US, Academic Press, Duluth, MN, vol. 36, No. 2, Aug. 1, 1996, pp. 189–194.

* cited by examiner

PORT ROUTER

This application is related to pending U.S. patent application Ser. No. 09/447/591 for "APPARATUS AND METHOD FOR DYNAMICALLY RECONFIGURING AN IO DEVICE" by Aguilar et. al. filed Jan. 4, 2000, the disclosure of which is incorporated herein by reference. This application claims priority to U.S. Provisional Patent Application Nos. 60/114,771 filed Jan. 5, 1999, Ser. No. 60/114,772 filed Jan. 5, 1999 and Ser. No. 60/114,767, filed Jan. 6, 1999 which are also incorporated by reference.

Field of the Invention

This invention relates to semi-conductor devices and, more particularly, to port routers.

Existing compute platforms feature mechanisms for attaching devices to the computer and performing input/output (IO) between the compute platform and the ports where an external device would be connections between ports and an IO controller resident inside the computer platform. This technique of providing a routing mechanism that is fixed limits the ability for a system to adapt to changing requirements such as the addition of new devices or the introduction of devices of devices which require the full capacity of a single IO controller.

There are increasing circumstances in which multiple IO controllers will be available within a single device or system. Platforms such as information appliances, set-top boxes, cable modems, game consoles, smart appliances, handheld computers, palm-sized computers, embedded control systems, workstations and servers, etc., will contain multiple IO controllers. Currently available techniques do not include any mechanism for the dynamic re-routing between ports and IO controllers. It is therefore desirable to be able to dynamically change the routing when new devices are added or when devices requiring the full capacity of a single IO controller are introduced. A need exists for a mechanism for the dynamic connection of the physical connections (ports) to the IO controller(s) resident inside the compute platform.

SUMMARY OF THE INVENTION

In one aspect of the invention a port router is provided comprising a controller switch, a port switch, and one or more connections between the controller switch and the port switch. The controller switch, the port switch and the one or more connections are adapted to provide dynamic re-routing of connections between the port switch inputs and the controller switch outputs.

In another aspect of the invention, a method is provided for dynamically routing ports to internal circuitry of a computer platform. The method comprises providing a configurable switching circuit, querying the configurable switching circuit to determine a default topology, computing an optimized topology upon the occurrence of a change of the data flow through the configurable switching circuit, suspending operation and effecting re-routing between the interface ports and the internal circuitry based on the optimized topology, and resuming IO operations through the configurable switching circuit.

The invention may be used in a personal computer system, but can also be applied to other types of computer platforms, including but not limited to information appliances, set-top boxes, cable modems, game consoled, smart appliances, handheld, computers, palm-sized computers, embedded control system, workstations, servers and the like.

DETAILED DESCRIPTION OF THE INVENTION

The invention provides a configurable switching circuit to permit the dynamic formation and re-routing of the connection(s) between a port and internal circuitry. In one embodiment, the invention provides an apparatus for the dynamic routing between an individual or group of physical connections (ports) to one or more of the IO controllers resident inside the compute platform. One advantage of the invention is the ability to adapt to a change in the number or requirements of IO devices (which cause a change in the optimal data flow topology), by re-routing ports to permit a new topology to be established. This ability to provide adaptive routing enables a system or device to dedicate bandwidth resources for devices that cannot operate in a contentious environment. Another advantage of the invention includes the ability to use the port router as a blocking mechanism to permit the isolation of a particular IO port from the system. This is particularly useful where a device is misbehaving or causing the system to malfunction.

IO controllers provide the mechanism for system software to transmit and receive data. Ports provide the attachment mechanism for devices to be connected to a compute system. Next generation computer platforms will be available with multiple IO controllers within a single device or system. Conventional hard wired routings mechanisms limit the ability of a system to adapt to changing requirements of the system. The present invention provides a routing mechanism that avoids these limitations, and allows the dynamic routing and re-routing when new devices are added to the system or when devices requiring the full capacity of a single IO controller are introduced. The invention further provides a mechanism for dynamic load balancing of the data, to and from devices, among multiple IO controllers that may be present in a compute platform.

The invention may be used in a personal computer system, but can also be applied to other types of computer platforms, including but not limited to information appliances, set-top boxes, cable modems, game consoles, smart appliances, handheld computers, palm-sized computers, embedded control systems, workstations, servers and the like.

The representations of FIGS. 1–4 are for purposes of illustration only and are not intended to limit the possible implementations of the invention. In the illustrative examples of selected embodiments of the invention, FIGS. 1–4, the port router 100 is shown supporting four ports and up to four IO controllers. The number of ports and IO controllers present in a particular system or application may vary based on system requirements. In addition, it should be understood that the "inputs" and "outputs" described herein all refer to connections which can handle bi-directional data flow (commonly referred to as "input/outputs").

Figure 1:
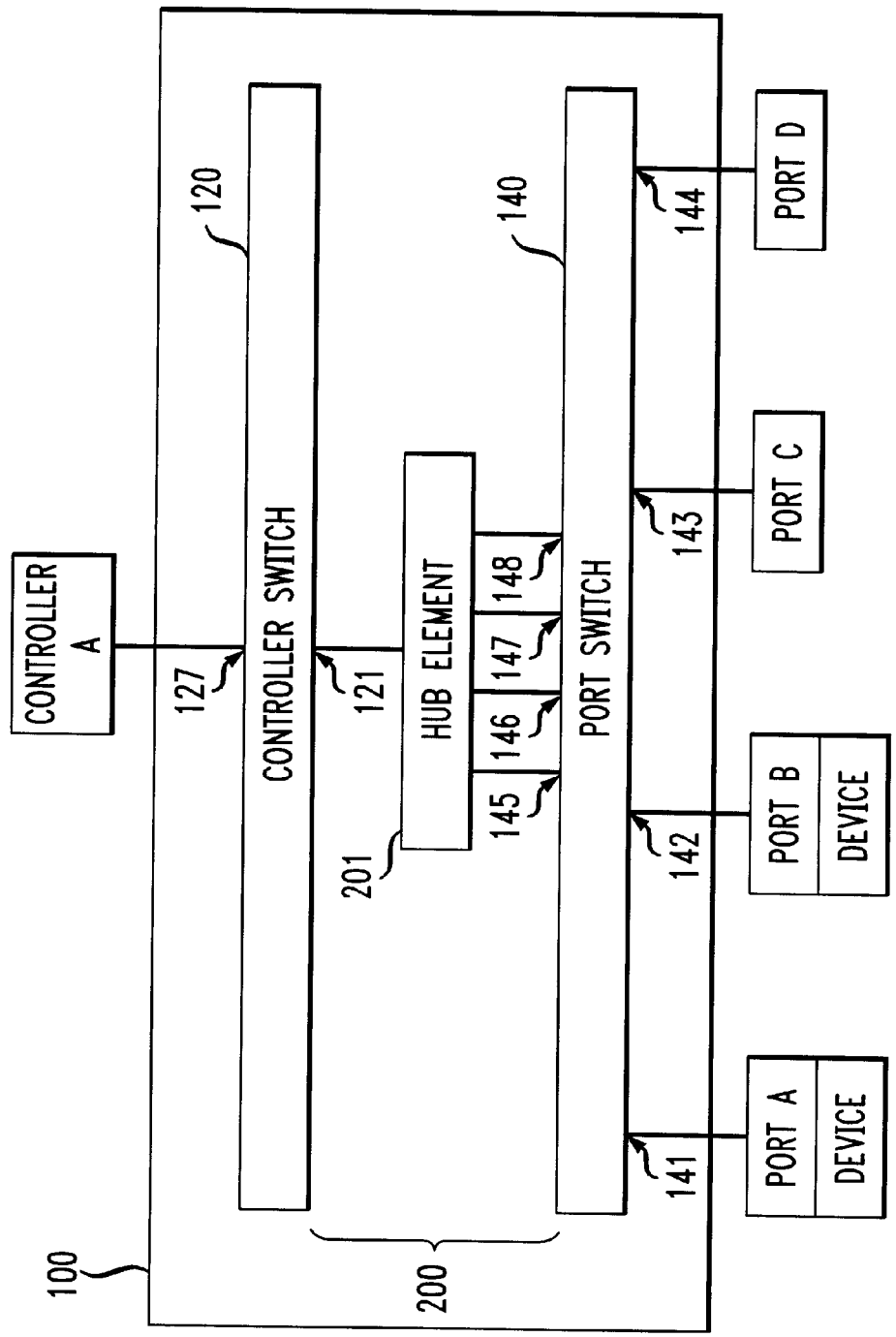
FIG. 1 is a block diagram of one embodiment of the invention.

FIG. 1 is a block diagram illustrating one embodiments of the invention. The port router 100 comprises a controller switch 120, a port switch 140 and connection(s) 200 comprises a hud element 201. Port router 100 connects port A–D to a single controller, Controller A. The controller switch 120, the port switch 140 and the connection(s) 200 each have specific input and output capabilities. The port switch 140 has fixed inputs, 141–144, each connected to an interface port. The port switch 140 has a total number of outputs to for Hub element 201. The Hub element(s) preferably comply with the requirements of the IO interface for a given application. Each Hub element combines its inputs and provides a single output that is input in the controller switch 120. Some IO interfaces refers to the Hub Element 201 as a brigde, a concentrator or a physical interface. Multiple Hub elements may be used to connect the port switch 140 to the controller switch 120.

The controller switch 120 preferably has one input for each connection to a Hub element and one input for each direct connection (shown in FIGS. 2–4) to the port switch 140. The outputs from the controller switch 120 are fixed to match the number of controllers that are necessary or available in a given application. A shown in FIG. 1, the controller switch has one input 121 connected to Hub element 201, and one output 127 connected to Controller A.

Figure 2:
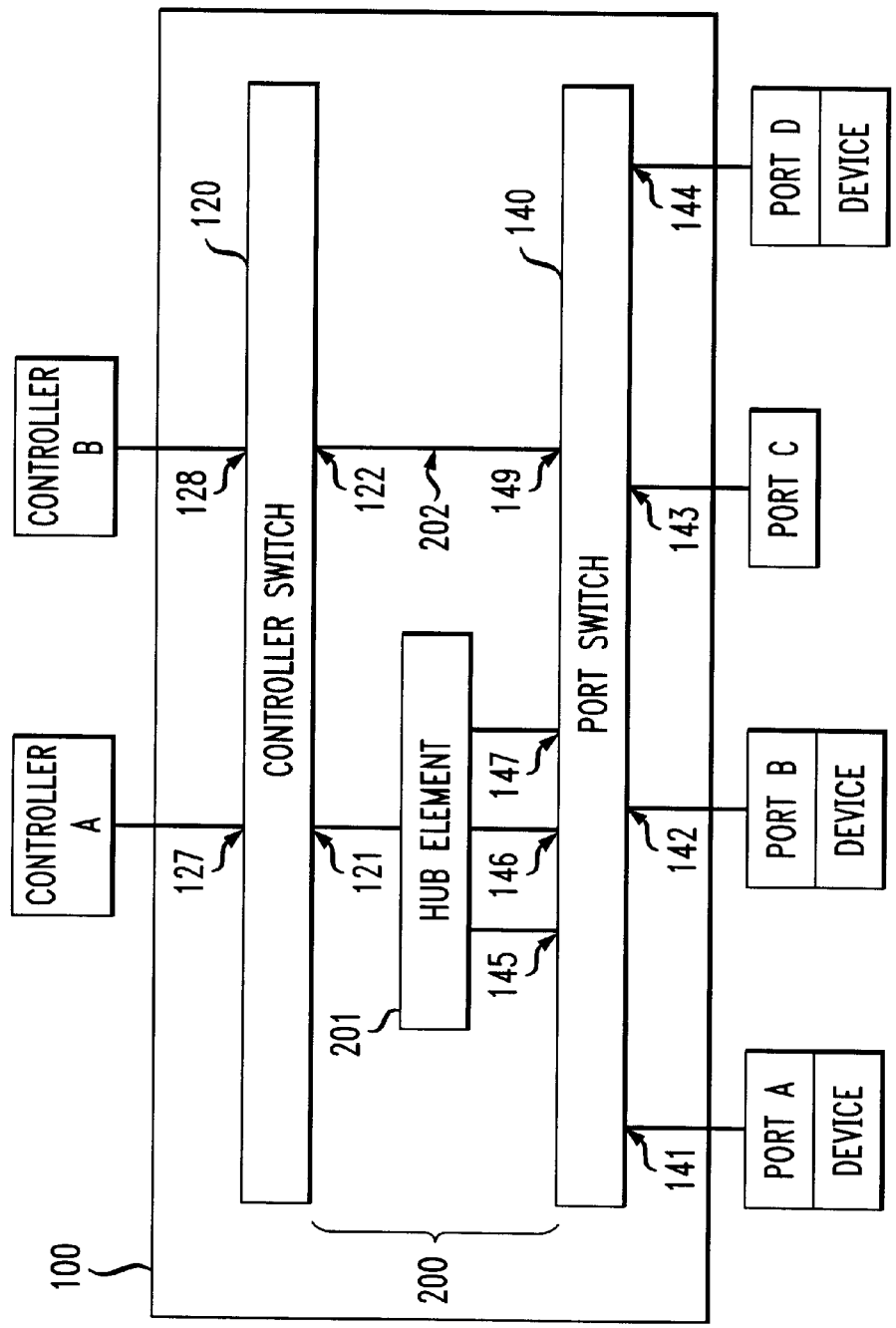
FIG. 2 is a block diagram of another embodiment of the invention.

FIG. 2 illustrates the addition of a new device to Port D, where the bandwidth capacity for Controller A reaches a threshold. Controller B is added to the system and the connection of Port D through Hub element 201 is removed and a direct connection 202 is added. Upon insertion of a device into Port D, the device is detected and it's capacity requirements are reported. This capacity is calculated to be larger than the effective capacity of Controller A. A new controller B is added to the system, and the port router 100 is reconfigured to effect the connection of Ports A, B and C to Controller A and Port D only to Controller B. The connection for Port D to the hub element 201 is removed and a new direct connection 202 is created between the port switch 140 and the controller switch 120. The connection to Controller B is created from controller switch output 128. All data flow to and from Port D and the new device flows through this new connection from the port switch output 149 to the controller switch input 122. All data flow from Ports A, B and C continues to have the same routing from port switch outputs 145, 146 and 147 to hub element 201. In this configuration the data flow from Ports A, B and C are combined and delivered to the controller switch input 121.

Figure 3:
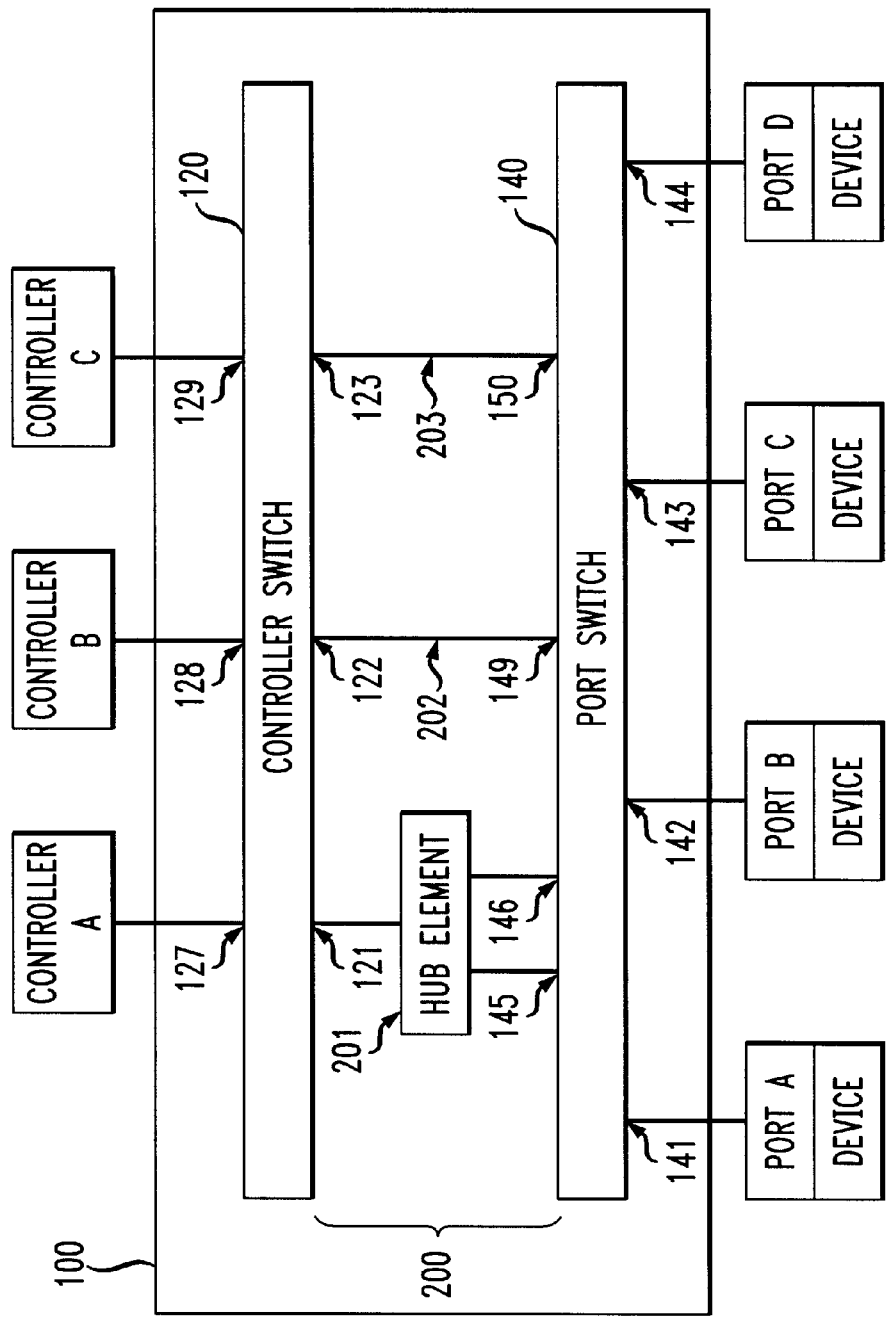
FIG. 3 is a block diagram of another embodiment of the invention.

FIG. 3 illustrates the addition of another device connected to interface Port C, the addition of Controller C, the removal of a Hub element 201 connection and the addition of another direct connection 203. Upon insertion of a device into Port C, the device is detected and it's capacity requirements are reported. The capacity is calculated to require a dedicated controller. Controller C is created and added to the system. The port router 100 is reconfigured to effect the connection of Port A and Port B to Controller A, Port C to Controller C and Port D to Controller B. The connection for Port C to the hub element 201 is removed and a new direct connection 203 is created between the port switch 140 and the controller switch 120. The connection to Controller C is created from controller switch output 129. All data flow to and from Port C and the newest device flows through this new connection from the port switch output 150 to the controller switch input 123. Data flows from Ports A and B continue to have the same routing from port switch outputs 145 and 146 to the hub element 201. The data flow from Port D continues from Port switch output 150 through connection 203 to controller switch input 123 to Controller B through controller switch output 128. In this configuration data flow from ports A and B are combined in hub element 201 and delivered to the controller switch input 121.

Figure 4:
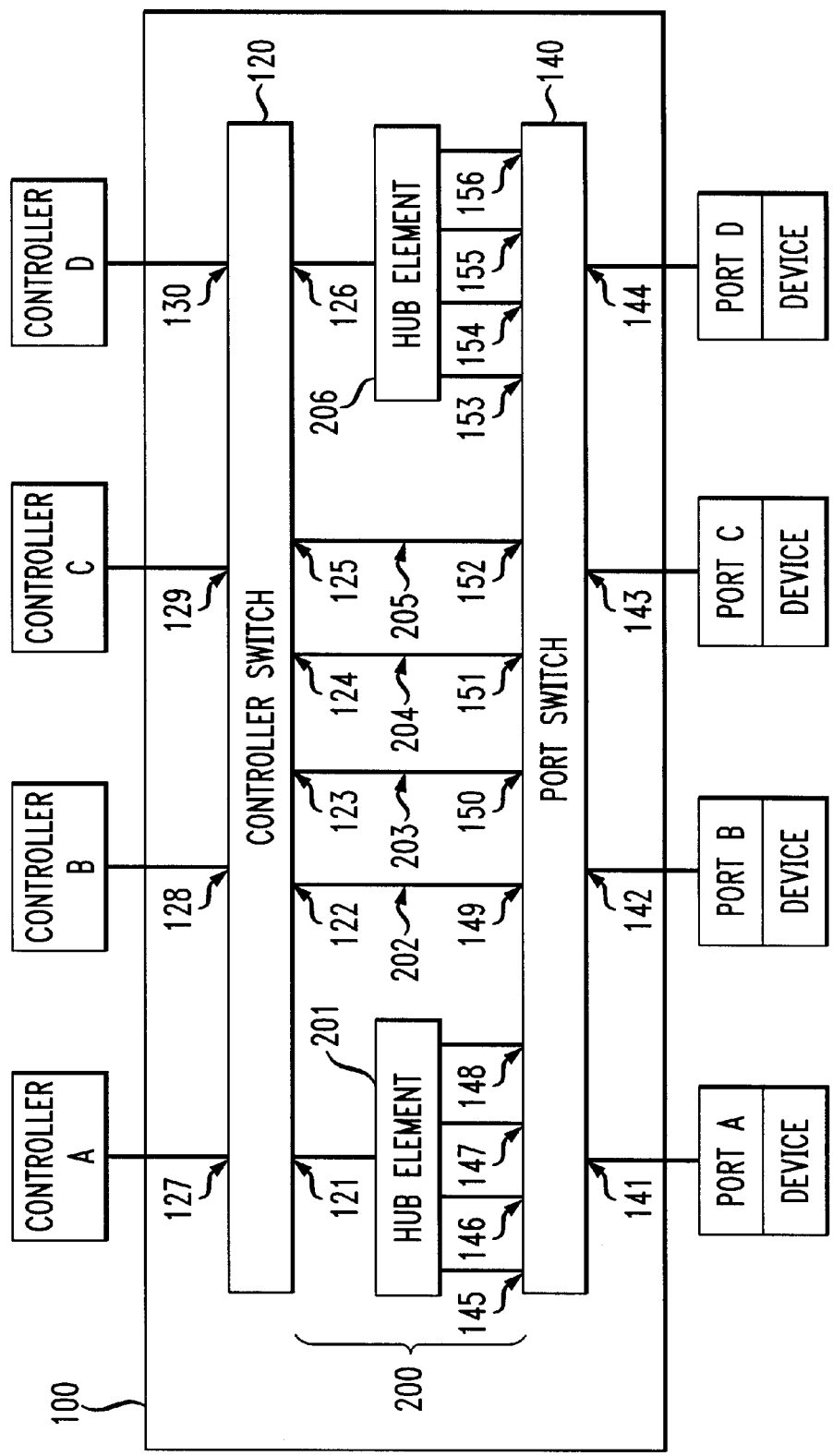
FIG. 4 is a block diagram of another embodiment of the invention.

FIG. 4 illustrates the total number of connections for a Four port and Four controller port router configuration. All the potential connections are shown but as illustrated in FIGS. 1–3, only certain connections are active depending on the desired topology. The topology is preferably optimized for efficient data flow. The port switch 140 will preferably have a single input for each Port that is present (i.e. 4 ports require 4 inputs, 5 ports would require 5 inputs, etc.). The port switch 140 has four output connection 149–152, one for each port, for direct connections to the controller switch 120, these are represented as connections 202, 203, 204 and 205. The number of hub elements may vary, in the illustration in FIG. 4 there are 2. In the illustrative example of FIG. 4, each hub element has exactly one output and one input for each port. Hub element 201 is connected to the port switch outputs 145148 and to controller switch input 121. Hub element 206 is connected to the port switch outputs 153–156 and controller port input 126. The controller switch will have one output for each controller that may be present in the system. The number of controllers in the system may vary. Preferably, the number of controllers is not more than the number of Ports supported, in our illustration 4. Controller switch outputs 127–130 are connected to the inputs for each controller A–D.

In operation, the port switch 100 will preferably start in a default state with certain port inputs connected to a desired Controller. The example of FIG. 1 shows a system having a default state with four Ports, two devices connected to Ports A and B, one Hub Element 201, and one Controller A. Through a set of hardware registers (not shown) preferably resident in the port router 100, software operating in the system can query the port router 100 and discover the default topology. The system software can effect a change in routing of signals between any combination of Ports and Controllers by programming values in the hardware registers. During operation an event occurs. An event may be a new device being removed or inserted into a Port. This event triggers the software to examine the requirements of the new device. These requirements may include the device's data capacity requirements (bandwidth and latency) and its data style (asynchronous, isochronous, burst, stream). The new requirements are combined with the current set of requirements from devices already installed, and a new preferably optimized topology for routing the ports is computed. Preferably, the system software causes operations to suspend and effect the re-routing between the Ports and IO Controller (s). The system software then resumes IO operations and the optimized routing becomes the new routing until a new event occurs.

In another embodiment of the invention the port router 100 preferably contains embedded software which allows routing and re-routing to be effected internally without requiring the intervention of system software. This provides the ability for self-monitoring and dynamic load balancing based on the flow of data through the port router 100.

Thus, the port router according to one embodiment of the invention comprises a controller switch 120 having one or more inputs and one or more outputs, a port switch 140 having one or more inputs and one or more outputs, and one or more connections 200 between the controller switch 120 and the port switch 140. The controller switch 120, the port switch 140 and the one or more connections 200 are adapted to provide dynamic re-routing of connections between the port switch inputs and the controller switch outputs.

The controller switch 120, the port switch 140 and the one or more connections 200 may be dynamically configured to provide dynamic load balancing based on variable load requirements. The one or more connections 200 preferably comprise one or more hub elements 201, 206 and optionally one or more direct connections between the controller switch 120 and the port switch 140. The one or more hub elements 201, 206 are preferably adapted to receive one or more of the outputs from the port switch 140 and provide one input to the controller switch 120. The port switch inputs are preferably each connected to an interface port, and the port switch 140 is preferably adapted to route one or more interface ports to one or more of the port switch outputs. The controller switch 120 may further comprise one input for each direct connection to the port switch 140 and one input for each connection to the one or more hub elements 201, 206. Each of the one or more outputs from the controller switch 120 is preferably connected to a corresponding controller. The controller switch 120 and the port switch 140 each preferably comprise a crossbar switch.

In another aspect, the invention is an integrated circuit comprising a port switch 140 having one or more inputs each connected to one or more corresponding interface ports, a controller switch 120, and one or more connections 200 between the port switch 140 and the controller switch 120. The controller switch 120, the port switch 140 and the one or more connections 200 cooperatively provide a configurable switch adapted to dynamically re-route connections between the one or more interface ports and internal circuitry of a compute device.

The one or more connections 200 preferably comprise one or more hub elements and optionally one or more direct connections between the controller switch 120 and the port switch 140.

In another aspect, the invention is a method for dynamically routing ports to internal circuitry of a compute platform comprising, providing a configurable switching circuit, querying the configurable switching circuit to determine a default topology, computing an optimized topology upon the occurrence of a change of the data flow through the configurable switching circuit, suspending operation and effecting re-routing between the interface ports and the internal circuitry based on the optimized topology, and resuming IO operations through the configurable switching circuit.

The optimized topology preferably provides dynamic load balancing based on the flow of data through the configurable switching circuit. The change of the data flow through said configurable switching circuit may include a device being operatively connected to or disconnected from the port switch inputs or interface Port.

Although the invention has been described with reference to exemplary embodiments and accompanying drawings, it can be readily understood that the invention is not restricted to such embodiments and that various changes and modifications can be made by those skilled in the art without departing from the spirit and scope of the invention.

What is claimed is:

1. A port router comprising:
    a dynamic controller switch having one or more inputs and one or more outputs;
    a static port switch having one or more inputs and one or more outputs; and
    one or more connections between said controller switch and said port switch;
    wherein said controller switch, said port switch and said one or more connections are adapted to provide dynamic re-routing of connections between said port switch inputs and said controller switch outputs.

2. The port router of claim 1, wherein said controller switch, said port switch and said one or more connections may be dynamically configured to provide dynamic load balancing based on variable load requirements.

3. The port router of claim 1, wherein said one or more connections comprise one or more hub elements and optionally one or more direct connections between said controller switch and said port switch.

4. The port router of claim 3, wherein said one or more hub elements are adapted to receive one or more of said outputs from said port switch and provide one input to said controller switch.

5. The port router of claim 1, wherein said port switch inputs are each connected to an interface port, and wherein said port switch is adapted to route one or more interface ports to one or more of said port switch outputs.

6. The port router of claim 3, wherein said controller switch further comprises one input for each direct connection to said port switch and one input for each connection to said one or more hub elements.

7. The port router of claim 1, wherein each of said one or more outputs from said controller switch is connected to a corresponding controller.

8. The port router of claim 1, wherein said controller switch and said port switch each comprise a crossbar switch.

9. An integrated circuit comprising:
    a static port switch having one or more inputs each connected to one or more corresponding interface ports;
    a dynamic controller switch; and
    one or more connections between said port switch and said controller switch;
    wherein said controller switch, said port switch and said one or more connections cooperatively provide a configurable switch adapted to dynamically re-route connections between said one or more interface ports and internal circuitry of a compute device.

10. The integrated circuit of claim 9, wherein said one or more connections comprise one or more hub elements and optionally one or more direct connections between said controller switch and said port switch.

* * * * *